United States Patent [19]
Abusleme et al.

[11] Patent Number: 5,959,026
[45] Date of Patent: Sep. 28, 1999

[54] MICROEMULSIONS OF FLUOROPOLYOXYALKLENES IN ADMIXTURE WITH HYDROCAROCARBONS, AND THEIR USE IN (CO)POLYMERIZATION PROCESSES OF FLUORINATED MONOMERS

[75] Inventors: Julio A. Abusleme, Saronno; Alba Chittofrati, Milan, both of Italy

[73] Assignee: Ausimont S.p.A., Milan, Italy

[21] Appl. No.: 08/942,617

[22] Filed: Oct. 2, 1997

Related U.S. Application Data

[63] Continuation of application No. 08/558,599, Oct. 30, 1995, abandoned.

[30] Foreign Application Priority Data

Nov. 17, 1994 [IT] Italy .................................. MI94A2327

[51] Int. Cl.$^6$ ...................................... C08J 5/06
[52] U.S. Cl. ............................................... 524/758
[58] Field of Search ............................................ 524/758

[56] References Cited

U.S. PATENT DOCUMENTS

| | | | |
|---|---|---|---|
| 2,515,628 | 7/1950 | Edwards | 260/192 |
| 2,520,338 | 8/1950 | Robertson | 260/192 |
| 3,242,218 | 3/1966 | Miller | 260/615 |
| 3,467,635 | 9/1969 | Brasen et al. | 260/80.76 |
| 3,624,250 | 11/1971 | Carlson | 260/80.75 |
| 3,715,378 | 2/1973 | Sianesi et al. | 260/463 |
| 3,865,845 | 2/1975 | Resnick | 260/340.9 |
| 3,978,030 | 8/1976 | Resnick | 526/247 |
| 4,243,770 | 1/1981 | Tatemoto et al. | 525/331 |
| 4,451,646 | 5/1984 | Sianesi et al. | 528/401 |
| 4,513,129 | 4/1985 | Nakagawa et al. | 526/249 |
| 4,524,194 | 6/1985 | Dumoulin | 526/84 |
| 4,675,380 | 6/1987 | Buckmaster et al. | 528/481 |
| 4,694,045 | 9/1987 | Moore | 525/276 |
| 4,739,024 | 4/1988 | Moggi et al. | 526/216 |
| 4,864,006 | 9/1989 | Giannetti et al. | 526/209 |
| 4,973,633 | 11/1990 | Moore | 526/247 |
| 4,990,283 | 2/1991 | Visca et al. | 252/309 |
| 5,087,679 | 2/1992 | Inukai et al. | 526/249 |
| 5,091,589 | 2/1992 | Meyer et al. | 568/615 |

FOREIGN PATENT DOCUMENTS

| | | |
|---|---|---|
| 0051526A1 | 5/1982 | European Pat. Off. |
| 0073087A1 | 3/1983 | European Pat. Off. |
| 0076581A2 | 4/1983 | European Pat. Off. |
| 0080187A2 | 6/1983 | European Pat. Off. |
| 0148482A2 | 7/1985 | European Pat. Off. |
| 0154297A2 | 9/1985 | European Pat. Off. |
| 0244839A2 | 11/1987 | European Pat. Off. |
| 0250767 | 1/1988 | European Pat. Off. |
| 0280312A2 | 8/1988 | European Pat. Off. |
| 0337346B1 | 10/1989 | European Pat. Off. |
| 0340739A2 | 11/1989 | European Pat. Off. |
| 0340740A2 | 11/1989 | European Pat. Off. |
| 0346933 | 12/1989 | European Pat. Off. |
| 0407937A1 | 1/1991 | European Pat. Off. |
| 0445738A2 | 9/1991 | European Pat. Off. |
| 0518073A1 | 12/1992 | European Pat. Off. |
| 0612767A1 | 8/1994 | European Pat. Off. |
| 0617058 | 9/1994 | European Pat. Off. |
| 0625526A1 | 11/1994 | European Pat. Off. |
| 0626395 | 11/1994 | European Pat. Off. |
| 0633257A1 | 1/1995 | European Pat. Off. |
| 0633274A1 | 1/1995 | European Pat. Off. |
| 0650982A1 | 5/1995 | European Pat. Off. |
| 888765 | 2/1962 | United Kingdom. |
| 1104482 | 2/1968 | United Kingdom. |

OTHER PUBLICATIONS

"Encyclopedia of Chemical Technology", vol. 8, pp. 500–515, 1979.

*Primary Examiner*—Peter D. Mulcahy
*Attorney, Agent, or Firm*—Nikaido, Marmelstein, Murray & Oram, LLP

[57] ABSTRACT

Microemulsions are described which comprise:

(a) water;

(b) a fluoropolyoxyalkylene having hydrogenated end groups and/or hydrogenated repetitive units;

(c) an hydrocarbon $C_1–C_{20}$, preferably $C_1–C_{12}$, of aliphatic, aromatic, or mixed type, optionally containing halogens, preferably chlorine and/or bromine;

(d) a fluorinated surfactant.

Such microemulsions can be used in radical (co) polymerization processes in aqueous emulsion of one or more fluorinated olefinic monomers, optionally in association with one or more non fluorinated olefins.

17 Claims, No Drawings

MICROEMULSIONS OF FLUOROPOLYOXYALKLENES IN ADMIXTURE WITH HYDROCAROCARBONS, AND THEIR USE IN (CO)POLYMERIZATION PROCESSES OF FLUORINATED MONOMERS

This application is a continuation of application Ser. No. 08/558,599, filed Oct. 30, 1995, now abandoned.

The present invention relates to microemulsions of fluoropolyoxyalkylenes in admixture with hydrocarbons, and to their use in a (co)polymerization process in aqueous emulsion of fluorinated monomers.

Microemulsions comprising as aqueous phase water, a fluorinated surfactant, optionally in admixture with a co-surfactant and, as oil phase, a perfluoropolyoxyalkylene, according to U.S. Pat. No. 4,990,283, are known.

In U.S. Pat. No. 4,864,006 a process for the (co) polymerization of fluorinated monomers in aqueous emulsion is described, wherein to the reaction medium a microemulsion of perfluoropolyoxyalkylenes according to the aforesaid U.S. Pat. No. 4,990,283 is added. With respect to a conventional (co)polymerization process in emulsion, the use of microemulsions allows to obtain various advantages, such as greater productivity, a better reproducibility as regards both the carrying out of the reaction and the features of the final product, an easier control of the reaction kinetic.

Such advantages are essentially due to the deep differences existing between a microemulsion and a conventional emulsion (or microemulsion). Indeed it is known that a microemulsion is a system wherein an aqueous phase is dispersed in an oil phase (in case of water-in-oil systems) or vice versa (in oil-in-water system), the dispersed phase being in the form of very little drops having a diameter lower than 2000 Å. It appears therefore as a limpid and macroscopically homogeneous solution. It is, in other words, a thermodynamically stable system in a certain temperature range, which spontaneously forms by simply mixing the components among each other, without supplying high mechanical energy.

On the contrary, a macroemulsion is a thermodynamically unstable system, having a lacteous aspect, since the dispersed phase is in the form of little drops of high diameter (of about some microns and more). In order to obtain a macroemulsion it is necessary to supply high mechanical energy, and the resulting system tends to unmix in two distinct phases due to ageing or centrifugation.

In EP patent 280,312 microemulsions comprising water, a fluorinated surfactant, optionally in admixture with a co-surfactant, and, as oil phase, a perfluoropolyoxyalkylene and a non fluorinated hydrocarbon, are described. It is a triphasic system, since the perfluoropolyoxyalkylene and the hydrocarbon are immiscible among each other and then form two distinct phases, the third phase being water. Among the possible applications of such microemulsions, it is suggested, analogously to what described in the above cited U.S. Pat. No. 4,864,006, the use in polymerization reactions of fluorinated monomers. In fact the presence of two distinct oil phases and immiscible among each other brings to various disadvantages, especially due to the different affinity of the various monomers, of the initiator and optionally also of the chain transfer agent with respect to the two oil phases. In particular, a worsening of the mechanical properties and of the thermal and chemical stability of the final polymer occurs, mainly due to dishomogeneity in the monomeric composition of the polymer and unforeseeable variations in the molecular weight distribution.

In European patent application No. 625526, filed on May 5, 1994 in the name of the Applicant, microemulsions of fluoropolyoxyalkylenes having hydrogenated end groups and/or hydrogenated repetitive units and their use in (co) polymerization processes of fluorinated olefinic monomers are described.

The Applicant has now surprisingly found that microemulsions can be obtained by mixing water, a fluorinated surfactant, a non fluorinated hydrocarbon and a fluoropolyoxyalkylene having hydrogenated end groups and/or hydrogenated repeating units and that such microemulsions can be used in polymerization processes of fluorinated monomers without observing the drawbacks mentioned above. Moreover, compared to the polymerization process described in U.S. Pat. No. 4,864,006, wherein perfluoropolyoxyalkylenes microemulsions are used, it is noticed, besides a decrease in the reaction trigger time, a considerable improvement of the mechanical properties of the final polymers.

Object of the present invention is therefore a microemulsion comprising:

(a) water;
(b) a fluoropolyoxyalkylene having hydrogenated end groups and/or hydrogenated repeating units;
(c) an hydrocarbon $C_1$–$C_{20}$, preferably $C_1$–$C_{12}$, of aliphatic, aromatic or mixed type, optionally containing halogens, preferably chlorine and/or bromine;
(d) a fluorinated surfactant.

A further object of the present invention is a radical (co)polymerization process in aqueous emulsion of one or more fluorinated olefinic monomers, optionally in the presence of one or more non fluorinated olefins, wherein a microemulsion as defined above is added to the reaction medium.

The fluoropolyoxyalkylenes having hydrogenated end groups and/or hydrogenated repetitive units, are known products, already described, for instance, in the already cited European patent No. 625526. They are formed of repeating units, randomly distributed along the chain, selected from:

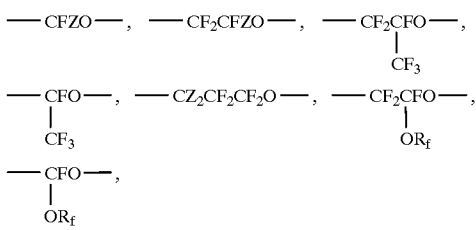

and by hydrogenated end groups selected from —$CF_2H$, —$CF_2CF_2H$, —$CFH$—$CF_3$, and —$CFH$—$OR_f$, wherein $R_f$ is defined as above; or a perfluorinated end group selected from —$CF_3$, —$C_2F_5$ and —$C_3F_7$, at least one of the end groups being hydrogenated. The perfluorinated end group can also contain a chlorine atom, for instance of the type $CF_2Cl$, $CF_3$—$CFCl$—$CF_2$,

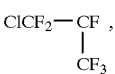

according to EP patents 340740, 340739.

The number average molecular weight is generally from 150 to 4000, preferably from 200 to 1000. The content in hydrogen is generally greater than 10 ppm, preferably higher than 100 ppm in practice the low value of hydrogen is obtained by a mixture of perfluoropolyethers containing H in the end group and/or H in the hydrogenated repeating units, with perfluoropolyethers not containing H as above defined. The higher values of hydrogen are obtained by using a mixture in which the part containing H is the major component of the mixture.

In particular, the fluoropolyoxyalkylenes containing hydrogen can be selected from the following classes:

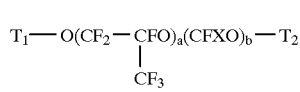
(a)

wherein:

$T_1$ and $T_2$, equal to or different from each other, are hydrogenated groups —$CF_2H$, —CFH—$CF_3$, or perfluorinated groups —$CF_3$, —$C_2F_5$, —$C_3F_7$, being at least one of the end groups hydrogenated; X is —F or —$CF_3$; a, b being integers such that the molecular weight is comprised in the above range, a/b being comprised between 5 and 15;

(b) $T_3$—$O(CF_2CF_2O)_c(CF_2O)_d$-$T_4$ wherein: $T_3$ and $T_4$, equal to or different from each other, are hydrogenated groups —$CF_2H$ or —$CF_2$—$CF_2H$, or perfluorinated groups —$CF_3$, —$C_2F_5$; being at least one of the end groups hydrogenated; c, d being integers such that the molecular weight is comprised in the above range, c/d is comprised between 0.3 and 5;

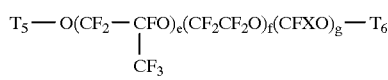
(c)

wherein:

$T_5$ and $T_6$, equal to or different from each other, are hydrogenated groups —$CF_2H$, —$CF_2CF_2H$, or —CFH—$CF_3$, or perfluorinated groups —$CF_3$, —$C_2F_5$, —$C_3F_7$, being at least one of the end groups hydrogenated; X is —F or —$CF_3$; e, f, g are integers such that the molecular weight is comprised in the above range, e/(f+g) being comprised between 1 and 10, f/g being comprised between 1 and 10;

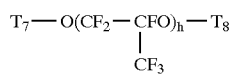
(d)

wherein:

$T_7$ and $T_8$ are hydrogenated groups —CFH—$CF_3$, or perfluorinated groups —$C_2F_5$, —$C_3F_7$, at least one of the end groups being hydrogenated; h being an integer such that the molecular weight is comprised in the above range (e) $T_9$—$O(CZ_2CF_2CF_2O)_i$-$T_{10}$ wherein:

$Z_2$ is F or H; $T_9$ and $T_{10}$, equal to or different from each other, are groups —$CF_2H$ or —$CF_2$—$CF_2H$, or perfluorinated groups —$CF_3$, —$C_2F_5$, —$C_3F_7$; being at least one of the end groups hydrogenated; i being an integer such that the molecular weight is comprised in the above range;

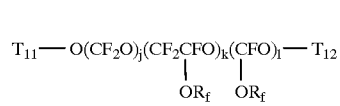
(f)

wherein:

$R_f$ is —$CF_3$, —$C_2F_5$, or —$C_3F_7$; $T_{11}$ and $T_{12}$, equal to or different from each other, are groups —$CF_2H$, —$CF_2CF_2H$, —CFH—$OR_f$, or perfluorinated groups —$CF_3$, —$C_2F_5$, —$C_3F_7$; being at least one of the end groups hydrogenated; j, k, l being integers such that the molecular weight is comprised in the range indicated above, k+l and j+k+l are at least equal to 2, k/(j+l) is comprised between $10^{-2}$ and $10^3$, l/j is comprised between $10^{-2}$ and $10^2$;

(g)

wherein:

$T_{13}$ and $T_{14}$, equal to or different from each other, are hydrogenated groups —$CF_2H$, —CFH—$CF_3$, or perfluorinated groups —$CF_3$, —$C_2F_5$, —$C_3F_7$; being at least one of the end groups hydrogenated; X is —F or —$CF_3$; m, n, o, p being integers such that the molecular weight is comprised in the range indicated above, m/n is comprised between 5 and 40, m/(o+p) is comprised between 2 and 50, o+p is at least 3, o is lower than p;

(h) $T_{15}$—$O(CF_2CF_2O)_q(CF_2O)_r(CFHO)_s(CF_2CFHO)_t$-$T_{16}$ wherein:

$T_{15}$ and $T_{16}$, equal to or different from each other, are hydrogenated groups —$CF_2H$, —$CF_2$—$CF_2H$, or perfluorinated groups —$CF_3$, —$C_2F_5$, at least one of the end groups being hydrogenated; q, r, s, t are integers such that the molecular weight is comprised in the range indicated above, q/r is comprised between 0.5 and 2, (q+r)/(s+r) is comprised between 3 and 40, s+t is at least 3, s is lower than t;

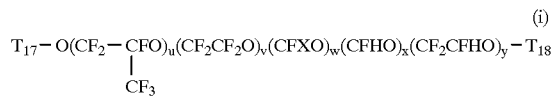
(i)

wherein:

$T_{17}$ and $T_{18}$, equal or different from each other, are hydrogenated groups —$CF_2H$, —$CF_2CF_2H$, —CFH—$CF_3$, or perfluorinated groups —$CF_3$, —$C_2F_5$, —$C_3F_7$; being at least one of the end groups hydrogenated: X is —F or —$CF_3$; u, v, w, x, y are integers such that the molecular weight is comprised in the range indicated above, (u+v)/w is comprised between 5 and 40, (u+v)/(x+y) is comprised between 2 and 50, x+y is at least 3, x is lower than y.

It is clear that the lower or higher hydrogen content in component (b) in general, and specifically in classes from (a) to (i) is obtainable, as indicated above. They are products obtainable by hydrolysis and subsequent decarboxylation of the —COF groups present in the corresponding perfluoropolyoxyalkylenes, as described for instance in the patents EP-154,297, U.S. Pat. No. 4,451,646 and U.S. Pat. No. 5,091,589.

The starting perfluoropolyethers containing the —COF groups as end groups and/or along the chain are described, for instance, in the patents GB-1,104,482 (class (a)), U.S. Pat. No. 3,715,378 (class (b)), U.S. Pat. No. 3,242,218

(classes (c) and (d)), EP-148,482 (class (e)), EP-445,738 (class (f)), EP-244,839 and EP-337,346 (classes (g), (h), (i)).

As regards component c) of the microemulsions object of the present invention, it can be selected for instance from branched aliphatic hydrocarbons $C_6$–$C_{20}$, preferably $C_6$–$C_{14}$, characterized by a ratio between number of methyl groups and number of carbon atoms higher than 0.5, as described in EP patent application EP-A-612,767. Examples of branched aliphatic hydrocarbons belonging to such class are: 2,3-dimethylbutane, 2,3-dimethylpentante, 2,2,4-trimethylpentane, 2,2,4,6,6-pentamethylheptane, 2,2,4,4,6-pentamethylheptane, or mixtures thereof.

Other usable hydrocarbons in the microemulsions object of the present invention are, for instance: cyclic aliphatic hydrocarbons, such as cyclopentaten, methylcyclo-pentane, cyclohexane, or n-pentane, iso-pentane, chloro-butane, chloroform, benzene, toluene and the like, or mixtures thereof.

The fluorinated surfactant (component (d)) can be of both ionic and non-ionic type. It is also possible to use mixtures of different surfactants. In particular, the fluorinated surfactant can be selected from the anionic ones of formula:

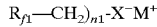

wherein: $n_1$ is 0 or an integer from 1 to 6; $R_{f1}$ is a (per)fluoroalkyl chain $C_5$–$C_{16}$ or a (per)fluoropolyoxyalkylene chain, $X^-$ is —COO$^-$ or —SO$_3^-$, $M^+$ is selected from: $H^+$, $NH_4^+$, alkali metal ion. The $R_{f1}$ chain can contain one or more anionic groups described above; the end group $R_f$ can contain chlorine atoms, see for instance above, EP Patents 340740, EP 340739.

In case a non-ionic fluorinated surfactant is used, it can be selected for instance from: polyoxyalkylenelfluoroalkylethers, for instance those of formula $R_{f2}CH_2(OC_2H_4)_{n2}OH$, wherein $R_{f2}$ is a fluoroalkyl $C_4$–$C_{30}$, and $n_2$ is an integer from 1 to 12 (as described in EP patent application EP-51,526); compounds formed by a perfluoropolyoxyalkylene chain bound to a polyoxyalkylene chain.

The microemulsions can also contain other polar organic compounds acting as co-solvents or co-surfactants, such as alcohols $C_1$–$C_{10}$, ketones $C_2$–$C_{10}$, esters $C_2$–$C_{10}$, both fluorinated and non fluorinated. To avoid destabilization problems of the microemulsion, such compounds are preferably added in amount lower than 10% by weight with respect to the total of the microemulsion components.

Salts soluble in water can also be added, in order to increase the ionic strength of the aqueous phase.

It is important to observe that, unlike what described in EP 280,312, the hydrocarbon is miscible with the fluoropolyoxyalkylene containing hydrogen in all ratios, whereby the microemulsion contains only one oil phase and then it does not cause the inconveniences described above due to the presence of two distinct oil phases. For the use in (co)polymerization reactions of fluorinated monomers, it is preferable that the amount of fluoropolyoxyalkylene is at least equal to 50% by volume of the total oil phase, preferably from 50 to 95% by volume.

The preparation of the microemulsions is performed by simply mixing the components, without the need to supply the system with a remarkable dispersion energy, as it occurs, on the contrary, in the case of conventional emulsions.

According to the experiments carried out by the Applicant, the replacement of a perfluoropolyoxyalkylene with a mixture formed by a fluoropolyoxyalkylene having hydrogenated end groups and/or hydrogenated repetitive units and by an hydrocarbon as oil phase does not involve substantial modifications of the criteria reported in the above patent U.S. Pat. No. 4,990,283 to lead the skilled person in the formulation of the microemulsions. Of course, under the same conditions, the presence of hydrogenated end groups and/or hydrogenated repetitive units involves a different affinity with respect to the other components, with more or less clear variations in the existing field with respect to the corresponding microemulsions of perfluoropolyoxyalkylenes. However, for the skilled person it is sufficient to carry out some tests in order to find the proper combination of parameters which allow to obtain the desired microemulsion.

As regards the (co)polymerization process of fluorinated olefinic monomers object of the present invention, as known, the (co)polymerization reaction occurs in the presence of suitable initiators, such as inorganic peroxides (for instance, ammonium or alkali metal persulphates) or organic peroxides (for instance, disuccinylperoxide, diisopropylperoxydicarbonate, diterbutylperoxide), or also azo compounds (see U.S. Pat. No. 2,518,628 and U.S. Pat. No. 2,520,338). It is also possible to employ organic or inorganic redox systems, such as ammonium persulphate/sodium sulphite, hydrogen peroxide/aminoiminomethansulphinic acid.

The amount of radical initiator is that usually employed for the (co)polymerization of fluorinated olefinic monomers, and it is generally comprised between 0.003% and 2% by weight with respect to the total amount of (co)polymerized monomers.

It is important to point out that the use of mixtures between an hydrocarbon and a fluoropolyoxyalkylene having hydrogenated end groups and/or hydrogenated repetitive units instead of a perfluoropolyoxyalkylene allows a greater flexibility in the selection of the initiator, since there is an increase of the affinity with non-fluorinated products. Particularly, in the process object of the present invention it is possible to employ hydrogenated organic peroxides insoluble in water and in perfluoropolyoxyalkylenes, such as for example bis-(4-t-butylcyclohexyl) peroxydicarbonate.

As known, the emulsion technique requires also the presence of surfactants to stabilize the polymer particles in the latex. Since the surfactants used in the microemulsion are of the same kind of those commonly used in this kind of (co)polymerizations, generally it is not necessary to add other surfactants, the amount present in the microemulsion being already sufficient to the purpose. If this situation does not occur, it is always possible to add other fluorinated surfactants of the same kind as described above. Among the most commonly used we remember: ammonium perfluorooctanoate, (per)fluoropolyoxyalkylenes terminated with one or more carboxylic groups, etc.

The reaction temperature can vary within a wide range, generally from 10° to 150° C., preferably from 50° to 80° C., while the pressure is generally comprised from 10 to 100 bar, preferably from 15 to 40 bar. The reaction can also be carried out by using a radical photoinitiator in the presence of visible-ultraviolet radiation, according to European patent application No. 650,982 in the name of the Applicant. In such a case, it is possible to employ very low temperatures, even up to −20° C., with pressures generally comprised from 3 to 50 bar.

The process object of the present invention can be employed with all kinds of fluorinated olefinic monomers, optionally containing hydrogen and/or chlorine and/or bromine and/or iodine and/or oxygen, provided that they are able to give (co)polymers by reaction with radical initiators in aqueous emulsion. Among them we cam cite: perfluoroolefins $C_2$–$C_8$, such as tetrafluoroethylene (TFE), hexafluoropropene (HFP), hexafluoroisobutene; hydrogenated fluoroolefins $C_2$–$C_8$, such as vinylfluoride (VF), vinylidene fluoride (VDF), trifluoroethylene, perfluoropolyoxyalkylene $CH_2=CH$—$R_f$, where $R_f$ is a perfluoroalkyl $C_1$–$C_6$; chloro- and/or bromo- and/or iodo-fluoroolefins $C_2$–$C_8$, such as chlorotrifluoroethylene (CTFE) and bromotrifluoroethylene; perfluorovinylethers $CF_2=CFOX$, where X is a perfluoroalkyl $C_1$–$C_6$, for instance trifluoromethyl or pentafluoropropyl, or a perfluoro-oxyalkyl $C_1$–$C_9$ having one or more ether groups, for instance perfluoro-2-propoxypropyl; perfluorodioxols.

The fluorinated olefinic monomers can also be copolymerized with non fluorinated olefins $C_2$–$C_8$, such as ethylene, propylene, isobutylene.

Among the polymers obtainable with the process object of the present invention one can cite for example:

(a) pertetrafluoroethylene or modified polytetrafluoroethylene containing small amounts, generally comprised between 0.1 and 3% by moles, preferably lower than 0.5% by moles, of one or more comonomers such as, for instance: perfluoropropene, perfluoroalkylvinylethers, vinylidene fluoride, hexafluoroisobutene, chlorotrifluoroethylene, perfluoropolyoxyalkylene;

(b) TFE thermoplastic polymers containing from 0.5 to 8% by moles of at least a perfluoroalkylvinylether, where the alkyl has from 1 to 6 carbon atoms, such as, for instance, TFE/perfluoropropylvinylether, TFE/perfluoromethylvinylether, TFE/perfluoroalkylethylene copolymers, terpolymers from TFE, perfluoromethylvinylether and another perfluorinated comonomer (as described in European patent application No. 633,274);

(c) TFE thermoplastic polymers containing from 2 to 20% by moles of a perfluoroolefin $C_3$–$C_8$, such as, for instance, FEP (TFE/HFP copolymer), to which other comonomers having vinylether structure (see for instance U.S. Pat. No. 4,675,380), can be added in small amounts (lower than 5% by mols);

(d) TFE or CTFE copolymers with ethylene, propylene or isobutylene, optionally containing a third fluorinated comonomer, for instance a perfluoroalkylvinylether, in amounts comprised between 0.1 and 10% by moles (see for instance U.S. Pat. Nos. 3,624,250 and 4,513,129);

(e) TFE elastomeric copolymers with a perfluoroalkylvinylether or a perfluorooxyalkylvinylether, optionally containing propylene or ethylene, besides lower amounts of a "cure-site" monomer (see for instance U.S. Pat. Nos. 3,467,635 and 4,694,045);

(f) polymers having dielectric characteristics, comprising 60–79% by moles of VDF, 18–22% by moles of trifluoroethylene and 3–22% by moles of CTFE (see U.S. Pat. No. 5,087,679);

(g) VDF elastomeric polymers, such as VDF/HFP copolymers and VDF/HFP/TFE terpolymers (see, for instance, GB patent 888.765 and Kirk-Otlammer, "Encyclopedia of Chemical Technology", Vol. 8, pag. 500–515 - 1979); such polymers can also contain: hydrogenated olefins, such as ethylene and propylene (as described for instance in EP-518,073); perfluoroalkylvinylethers; brominated and/or iodines "cure-site" comonomers; terminal iodine atoms, for instance according to U.S. Pat. No. 4,243,770, U.S. Pat. No. 4,973,633 and EP-487,937;

(h) polyvinylidene fluoride or modified polyvinylidene fluoride containing small amounts, generally comprised between 0.1 and 10% by moles, of one or more fluorinated comonomers, such as vinylfluoride, chlorotrifluoroethylene, hexafluoropropene, tetrafluoroethylene, trifluoroethylene, etc. (see for instance U.S. Pat. Nos. 4,524,194 and 4,739,024).

The polymers of the classes indicated above, and in particular the polymers based on TFE, can be modified with perfluorinated dioxols, as described for instance in patents U.S. Pat. No. 3,865,845, U.S. Pat. No. 3,978,030, EP-73,087, EP-76,581, EP-80,187 and in European patent application No. 633,257.

The process object of the present invention is advantageously employed for preparing fluoropolymers containing hydrogen, in particular the copolymers from one or more per(halo)fluoroolefins with a non halogenated olefin (see for instance class (d) cited above), or homopolymers of fluorinated olefins containing hydrogen and their copolymers with per(halo)fluoroolefins and/or with unhalogenated olefins (see for instance classes (g) and (h) described above).

Some working examples are hereinunder reported, whose aim is merely illustrative but not limitative of the scope of the present invention.

EXAMPLE 1

Preparation of the microemulsion of a mixture between a fluoropolyoxyalkylene having hydrogenated end groups and an hydrocarbon.

In a glass flask equipped with a stirrer, were mixed under mild stirring 15.96 g of demineralized $H_2O$, 14.44 g of a surfactant of the formula:

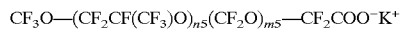

having a $m_5/n_5$ ratio=26.2 and a number average molecular weight of about 580, and 7.6 g of a solution formed by 2,2,4-trimethylpentane and by a fluoropolyoxyalkylene containing hydrogen atoms in terminal position, having the formula:

wherein $R_{f5}$ is —$CF_3$, —$CF_2CF_3$, —$CF_2CF_2CF_3$, —$CF(CF_3)CF_3$; R' is —OCFH—$CF_3$, —$OCF_2H$ (in 50:1 ratio) and $R_{f5}$, $t_5$ being an integer so that the number average molecular weight equal to 400 and with a content of hydrogen atoms equal to 150 ppm. The volume ratio between fluoro-polyoxyalkylene and hydrocarbon is 3:1. At temperature comprised between 31° C. and 55° C., the system spontaneously forms a microemulsion, which appears as a limpid, thermo-dynamically stable solution.

Homopolymerization of VDF

A 5 l AISI 316 steel chrominum-plated autoclave, equipped with a stirrer working at 570 rpm, after vacuum and 3.8 l of demineralized $H_2O$, 38.0 g of the microemulsion previously prepared (containing 14.44 g o surfactant), and 2.0 ml of chloroform as chin transfer agent were added in sequence.

The autoclave was then brought to the reaction temperature of 115° C. and loaded with VDF until the working pressure of 50 absolute bar was reached. 17.0 ml of diterbutylperoxide were then introduced. The working pressure was maintained constant during the reaction by feeding VDF.

The reaction started after 5 minutes. After 333 minutes the reaction was stopped by cooling the autoclave at room temperature. The so obtained latex (160 g of polymer per liter of latex with particles having a diameter of about 80.9 nm, determined by light scattering measurements) was then discharged, coagulated by mechanical stirring, washed with H$_2$O and dried at 105° C. The polymer was characterized as reported in Table 1. The temperature of second melting (T$_{2m}$) was determined by scanning differential calorimetry (DSC), the Melt Flow Index (MFI) was measured at 232° C. with a load of 5 kg according to ASTM D-3222088 standard, the mechanical properties were determined at 23° C. according to ASTM D-1708 standard.

EXAMPLE 2 (comparative)

Preparation of the perfluoropolyoxyalkylene microemulsion.

In a glass flask equipped with a stirrer, 15.96 g of demineralized H$_2$O, 14.44 g of the surfactant of the formula:

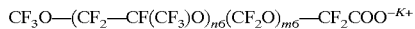

$$CF_3O\text{—}(CF_2\text{—}CF(CF_3)O)_{n6}(CF_2O)_{m6}\text{—}CF_2COO^{-K+}$$

having n$_6$/m$_6$=26.2 and number average molecular weight of 580, and 7.6 g of Galden® DO2, having the formula:

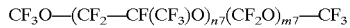

$$CF_3O\text{—}(CF_2\text{—}CF(CF_3)O)_{n7}(CF_2O)_{m7}\text{—}CF_3$$

having ratio n$_7$m$_7$=20 and average molecular weight of 450, were mixed under mild stirring. At a temperature from 0° to 55° C. the system spontaneously forms a microemulsion, which appears as a limpid, thermodynamically stable solution.

Homopolymerization of VDF

A 5 l AISI 316 steel chromium-plated autoclave, equipped with a stirrer working at 570 rpm, was evacuated and 3.8 l of demineralized H$_2$O, 38.0 g of the microemulsion previously prepared (containing 14.44 g of surfactant), and 2.0 ml of chloroform as chain transfer agent were added in sequence.

The autoclave was then brought to the reaction temperature of 115° C. and loaded with VDF until the working pressure of 50 absolute bar was reached. 17.0 ml of diterbutylperoxide were then introduced. The working pressure was maintained constant during the reaction by feeding VDF.

The reaction started after 17 minutes. After 205 minutes the reaction was stopped by cooling the autoclave at room temperature. The so obtained latex (168 g of polymer per liter of latex with particles having a diameter of about 72.9 mn, determined by light scattering measurements) was then discharged, coagulated by mechanical stirring, washed with H$_2$O and dried at 105° C. The polymer was characterized as reported in Table 1.

EXAMPLE 3 (comparative)

Example 1 was repeated utilizing, instead of the microemulsion, 14.44 g of the surfactant Surflon® S111S (perfluoroalkyl-ammonium carboxylate).

The reaction started after 7 minutes. After 397 minutes the reaction was stopped by cooling the autoclave at room temperature. The so obtained latex (163.5 g of polymer per liter of latex with particles having a diameter of about 110 nm, determined by light scattering measurements) was then discharged, coagulated by mechanical stirrer, washed with H$_2$O and dried at 105° C. The polymer was characterized as reported in Table 1.

TABLE 1

| EXAMPLE | 1 | 2(*) | 3(*) |
|---|---|---|---|
| T$_{2m}$ (° C.) | 167.7 | 166.7 | 166.9 |
| MFI (g/10') | 5.7 | 2.7 | 7.2 |
| Elastic Modulus (MPa) | 1637 | 1518 | 1540 |
| Yield strength (MPa) | 50.24 | 48.33 | 48.50 |
| Stress at break (MPa) | 29.0 | 26.7 | 29.0 |
| Elongation at break (%) | 117 | 117 | 140 |

(*)comparative

We claim:

1. Microemulsions which consist of:

(a) water;

(b) a fluoropolyoxyalkylene having hydrogenated end groups and/or hydrogenated repetitive units;

(c) a branched aliphatic C$_6$–C$_{20}$ hydrocarbon optionally containing halogens other than fluorine; and (d) a fluorinated surfactant.

2. Microemulsions according to claim 1, wherein fluoropolyoxyalkylene is formed by repetitive units, randomly distributed along the chain, selected from the group consisting of:

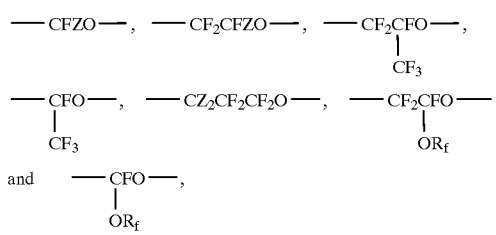

and by hydrogenated end groups selected from the group consisting of —CF$_2$H, —CF$_2$CF$_2$H, —CFH—CF$_3$, and —CFH—OR$_f$, wherein R$_f$ is defined as above; or perfluorinated end groups selected from the group consisting of —CF$_3$, —C$_2$F$_5$ and —C$_3$F$_7$; being at least one of the end groups hydrogenated.

3. Microemulsions according to claim 1, wherein the fluoropolyoxyalkylene has a number average molecular weight from 150 to 4000.

4. Microemulsions according to claim 3, wherein the fluoropolyoxyalkylene has a number average molecular weight from 200 to 1000.

5. Microemulsions according to claim 1, wherein the amount of hydrogenated end groups and/or hydrogenated repetitive units in the fluoropolyoxyalkylene is such that the content of hydrogen is greater than 10 ppm.

6. Microemulsions according to claim 5, wherein the amount of hydrogenated end groups and/or hydrogenated repetitive units in the fluoropolyoxyalkylene is such that the content in hydrogen is greater than 100 ppm.

7. Microemulsions according to claim 1, wherein fluoropolyoxyalkylene is selected from the following classes:

(a)
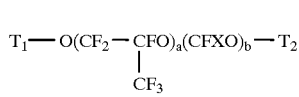

wherein:

$T_1$ and $T_2$, equal to or different from each other, are hydrogenated groups $-CF_2H$, $-CFH-CF_3$, or perfluorinated groups $-CF_3$, $-C_2F_5$, $-C_3F_7$; at least one of the end groups being hydrogenated; X is $-F$ or $-CF_3$; a, b are numbers such that the molecular weight is comprised in the range indicated above, a/b is comprised between 5 and 15;

(b) $T_3-O(CF_2CF_2O)_c(CF_2O)_d-T_4$ wherein:

$T_3$ and $T_4$, equal to or different from each other, are hydrogenated groups $-CF_2H$ or $-CF_2-CF_2H$, or perfluorinated groups $-CF_3$, $-C_2F_5$, at least one of the end groups being hydrogenated; c, d are numbers such that the molecular weight is comprised in the range indicated above, c/d is comprised between 0.3 and 5;

(c)
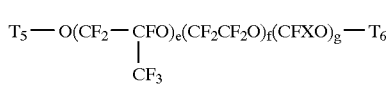

wherein:

$T_5$ and $T_6$, equal to or different from each other, are hydrogenated groups $-CF_2H$, $-CF_2-CF_2H$, or $-CFH-CF_3$, or perfluorinated groups $-CF_3$, $-C_2F_5$, $-C_3F_7$, at least one of the end groups being hydrogenated; X is $-F$ or $-CF_3$; e, f, g are numbers such that the molecular weight is comprised in the range indicated above, e/(f+g) is comprised between 1 and 10, f/g is comprised between 1 and 10;

(d)
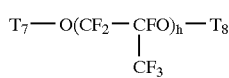

wherein:

$T_7$ and $T_8$ are hydrogenated groups $-CFH-CF_3$, or perfluorinated groups $-C_2F_5$, $-C_3F_7$, at least one of the end groups being hydrogenated; h is a number such that the molecular weight is comprised in the range indicated above;

(e) $T_9-O(CZ_2CF_2CF_2O)_i-T_{10}$ wherein:

$Z_2$ is $-F$ or $-H$; $T_9$ and $T_{10}$, equal to or different from each other, are groups $-CF_2H$ or $-CF_2-CF_2H$, or perfluorinated groups $-CF_3$, $-C_2F_5$, $-C_3F_7$, at least one of the end groups being hydrogenated; i is a number such that the molecular weight is comprised in the range indicated above;

(f)
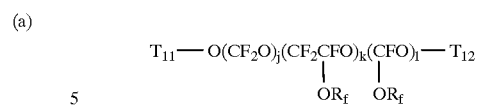

wherein:

$R_f$ is $-CF_3$, $-C_2F_5$, or $-C_3F_7$; $T_{11}$ and $T_{12}$, equal to or different from each other, are groups $-CF_2H$, $-CF_2CF_2H$, $-CFH-OR_f$, or perfluorinated groups $-CF_3$, $-C_2F_5$, $-C_3F_7$, at least one of the end groups being hydrogenated; j, k, l are numbers such that the molecular weight is comprised in the range indicated above, k+l and j+k+l are at least equal to 2, k/(j+l) is comprised between $10^{-2}$ and $10^3$, l/j is comprised between $10^{-2}$ and $10^2$;

(g)

wherein:

$T_{13}$ and $T_{14}$, equal to or different from each other, are hydrogenated groups $-CF_2H$, $-CFH-CF_3$, or perfluorinated groups $-CF_3$, $-C_2F_5$, $-C_3F_7$, at least one of the end groups being hydrogenated; X is $-F$ or $-CF_3$; m, n, o, p are numbers such that the molecular weight is comprised in the range indicated above, m/n is comprised between 5 and 40, m/(o+p) is comprised between 2 and 50, o+p is at least 3, o is lower than p;

(h) $T_{15}-O(CF_2CF_2O)_q(CF_2O)_r(CFHO)_s(CF_2CFHO)_t-T_{16}$ wherein:

$T_{15}$ and $T_{16}$, equal to or different from each other, are hydrogenated groups $-CF_2H$, $-CF_2-CF_2H$, or perfluorinated groups $-CF_3$, $-C_2F_5$, at least one of the end groups being hydrogenated; q, r, s, t are numbers such that the molecular weight is comprised in the range indicated above, q/r is comprised between 0.5 and 2, (q+r)/(s+t) is comprised between 3 and 40, s+t is at least 3, s is lower than t;

(i)
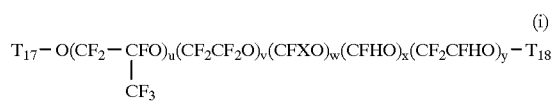

wherein:

$T_{17}$ and $T_{18}$, equal to or different from each other, are hydrogenated groups $-CF_2H$, $-CF_2CF_2H$, $-CFH-CF_3$, or perfluorinated groups $-CF_3$, $-C_2F_5$, $-C_3F_7$, at least one of the end groups being hydrogenated; is $-F$ or $-CF_3$; u, v, w, x, y are numbers such that the molecular weight is comprised in the range indicated above, (u+v)/w is comprised between 5 and 40, (u+v)/(x+y) is comprised between 2 and 50, x+y is at least 3, x is lower than y.

8. Microemulsions according to claim 1, wherein the components (c) is selected from branched aliphatic hydrocarbons $C_6-C_{20}$, characterized by a ratio between number of methyl groups and number of carbon atoms higher than 0.5 or mixtures thereof.

9. Microemulsions according to claim 1, wherein the component (d) is selected from anionic fluorinated surfactants and non ionic fluorinated surfactants, or mixtures thereof.

10. Microemulsions according to claim 9, wherein the anionic fluorinated surfactant has the formula:

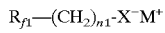

wherein: $n_1$ is 0 or an integer from 1 to 6; $R_{f1}$ is a (per)fluoroalkyl chain $C_5-C_{16}$ or a (per)fluoropolyoxyalkylene chain, $X^-$ is $—COO^-$ or $—SO_3^-$, $M^+$ is selected from: $H^{30}$, $NH_4^+$, alkali metal ion, the $R_f$ chain containing one or more groups $—(CH_2)_{n1}—X^-M^+$.

11. Microemulsions according to claim 9, wherein the non ionic fluorinated surfactant is selected from: polyoxyalkylene-fluoroalkylethers; compounds formed by a perfluoropolyoxyalkylene chain bound to a polyoxyalkylene chain.

12. Microemulsions according to claim 1, wherein the fluoropolyoxyalkylene (b) is at least equal to 50% by volume of the total oil phase.

13. Radical (co)polymerization process in aqueous emulsion of one or more fluorinated olefinic monomers, optionally in association with one or more non fluorinated olefins, wherein a microemulsion according to claim 1 is added to the reaction medium.

14. Process according to claim 13, wherein the fluorinated olefinic monomers are selected from: perfluoroolefins $C_2-C_8$; hydrogenated fluoroolefins $C_2-C_8$; chloro- and/or bromo- and/or iodo-fluoroolefins $C_2-C_8$; perfluorovinylethers $CF_2=CFOX$, wherein X is a perfluoroalkyl $C_1-C_6$, or a perfluoro-oxyalkyl $C_1-C_9$ having one or more ether groups; perfluorodioxols.

15. Process according to claim 13, wherein the olefinic monomers are copolymerized with non fluorinated olefins $C_2-C_8$.

16. Process according to claim 13, wherein a fluoropolymer containing hydrogen is prepared.

17. Process according to claim 16, wherein the fluoropolymer containing hydrogen is selected from: copolymers from one or more per(halo)fluoroolefins with a non halogenated olefin; homopolymers of fluorinated olefins containing hydrogen and their copolymers with per(halo)fluoroolefins and/or with non halogenated olefins.

* * * * *